United States Patent
Miyazaki et al.

Patent Number: 6,040,931
Date of Patent: Mar. 21, 2000

[54] OPTICAL TRANSMITTER, TERMINAL-STATION APPARATUS HAVING THE OPTICAL TRANSMITTER, AND OPTICAL COMMUNICATION SYSTEM

[75] Inventors: Akimitsu Miyazaki; Sadao Ibukuro; Yasunori Nagakubo, all of Kawasaki, Japan

[73] Assignee: Fujitsu Limited, Kawasaki, Japan

[21] Appl. No.: 08/859,253

[22] Filed: May 20, 1997

[30] Foreign Application Priority Data

Nov. 26, 1996 [JP] Japan ................................. 8-314744

[51] Int. Cl.[7] ............................................. H04B 10/08
[52] U.S. Cl. .......................... 359/110; 359/124; 359/129; 359/173; 359/180
[58] Field of Search ................................... 359/110, 124, 359/180, 187, 188, 127, 129, 130, 154, 160, 173, 174, 179

[56] References Cited

U.S. PATENT DOCUMENTS

| | | |
|---|---|---|
| 5,305,134 | 4/1994 | Tsushima et al. ............. 359/124 X |
| 5,673,129 | 9/1997 | Mizrahi ............................. 359/124 |
| 5,710,846 | 1/1998 | Wayman et al. ............... 359/110 X |
| 5,745,270 | 4/1998 | Koch ................................. 359/124 |
| 5,760,940 | 6/1998 | Frigo ............................. 359/110 X |
| 5,793,481 | 8/1998 | Leali ................................ 356/73.1 |
| 5,894,362 | 4/1999 | Onaka et al. ...................... 359/124 |

Primary Examiner—Thomas Mullen
Attorney, Agent, or Firm—Staas & Halsey

[57] ABSTRACT

An optical transmitter, a terminal-station apparatus having the optical transmitter, and an optical communication system employing the terminal-station apparatus. The optical transmitter comprises: a light-source unit for generating an optical signal; a monitor unit for monitoring a parameter depending on the wavelength of the optical signal; a judgment unit for determining as to whether or not the monitored parameter satisfies a predetermined condition; and a shut-off unit for shutting off the optical signal in case the monitored parameter does not satisfy the predetermined condition. By using the optical transmitter, it can be possible to prevent crosstalk from occurring between WDM (Wavelength Division Multiplexing) channels in the optical communication system.

24 Claims, 12 Drawing Sheets

OPTICAL TRANSMITTER, TERMINAL-STATION APPARATUS HAVING THE OPTICAL TRANSMITTER, AND OPTICAL COMMUNICATION SYSTEM

BACKGROUND OF THE INVENTION

1. Field of the Invention

The present invention relates generally to prevention of crosstalk occurring among channels of a WDM (Wavelength Division Multiplexing) system, and more particularly to an optical transmitter, a terminal-station apparatus having the optical transmitter and an optical communication system employing the terminal-station apparatus.

2. Description of the Related Art

As a terminal-station apparatus for implementing WDM of a plurality of wavelength channels, there is known a terminal-station apparatus comprising a plurality of optical transmitters for outputting optical signals with wavelengths different from each other and an optical multiplexer for carrying out WDM on the optical signals output by the optical transmitters and outputting an WDM signal light as a result of the WDM. The WDM signal light is transmitted to another terminal-station apparatus by an optical-fiber transmission line. By applying the WDM to a plurality of wavelength channels in this way, an optical-fiber communication system with a large transmission capacity can be implemented.

In an optical-fiber communication system to which the WDM is applied, the smaller the gap between two adjacent wavelength channels, the greater the number of wavelength channels that can be included in a given wavelength band and, inadvertently, the larger the amount of crosstalk occurring among the wavelength channels. Accordingly, there is a demand for reduction of the amount of crosswalk occurring among the wavelength channels which is observed as a result of decreasing the gap between two adjacent wavelength channels in an attempt to increase the transmission capacity of the optical-fiber communication system.

Each of the optical transmitters has a light-source unit for generating an optical signal for one channel. In general, the light-source unit has a laser diode to undergo direct or indirect modulation. The oscillation frequency of the laser diode is determined by the temperature of the laser diode and a driving current supplied thereto. Due to the characteristic of the laser diode described above, the wavelength of an optical signal output by the optical transmitter is prone to instability. For example, at a cold start of the optical-fiber communication system or due to a trouble related to the temperature control of the laser diode or other causes, the wavelength of an optical signal generated by the optical transmitter for a certain channel may deviate from a target wavelength assigned to the channel, giving rise to crosswalk occurring among channels. If crosswalk is generated among channels, the terminal-station apparatus receiving the WDM signal light is not capable of demodulating transmitted data with a high degree of accuracy.

SUMMARY OF THE INVENTION

It is thus an object of the present invention to provide an optical transmitter capable of preventing crosswalk from occurring between wavelength channels of a WDM system.

It is another object of the present invention to provide a terminal-station apparatus capable of preventing crosswalk from occurring between wavelength channels of a WDM system.

It is still another object of the present invention to provide an optical communication system capable of preventing crosswalk from occurring between wavelength channels of a WDM system.

According to a first aspect of the present invention, there is provided an optical transmitter, comprising: a light-source unit for generating an optical signal; a monitor for monitoring a parameter depending on the wavelength of the optical signal; a determiner for determining as to whether or not the monitored parameter satisfies a predetermined condition; and a shut-off unit for shutting off the optical signal in case the monitored parameter does not satisfy the predetermined condition.

In the configuration described above, if the monitored parameter, which is typically the wavelength of the optical signal itself or the temperature of a laser diode as the light-source unit, does not satisfy the predetermined condition, the outputting of optical signal can be shut off so that the wavelength of the optical signal output by the optical transmitter can be maintained at a value in an allowable limited range. As a result, by applying the present invention to each of a plurality of optical transmitters employed in a terminal-station apparatus, crosswalk can be prevented from occurring among WDM channels.

According to a second aspect of the present invention, there is provided a terminal-station apparatus for implementing wavelength division multiplexing. This apparatus comprises a plurality of optical transmitters for outputting optical signals with wavelengths different from each other, and an optical multiplexer for wavelength division multiplexing on the optical signals and outputting a wavelength division multiplexed signal light resulting from the wavelength division multiplexing. Each of the optical transmitters is an optical transmitter provided according to the first aspect of the present invention.

According to a third aspect of the present invention, there is provided an optical communication system for implementing wavelength division multiplexing. This system comprises first and second terminal-station apparatuses and an optical-fiber transmission line for connecting the first terminal-station apparatus to the second terminal-station apparatus. At least one of the first and second terminal-station apparatuses is a terminal-station apparatus provided according to the second aspect of the present invention.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

The present invention will become more apparent from the following detailed description of some preferred embodiments with reference to accompanying diagrams showing the embodiments. It should be noted that, in all the drawings, essentially identical elements are denoted by the same reference numeral.

Figure 1:
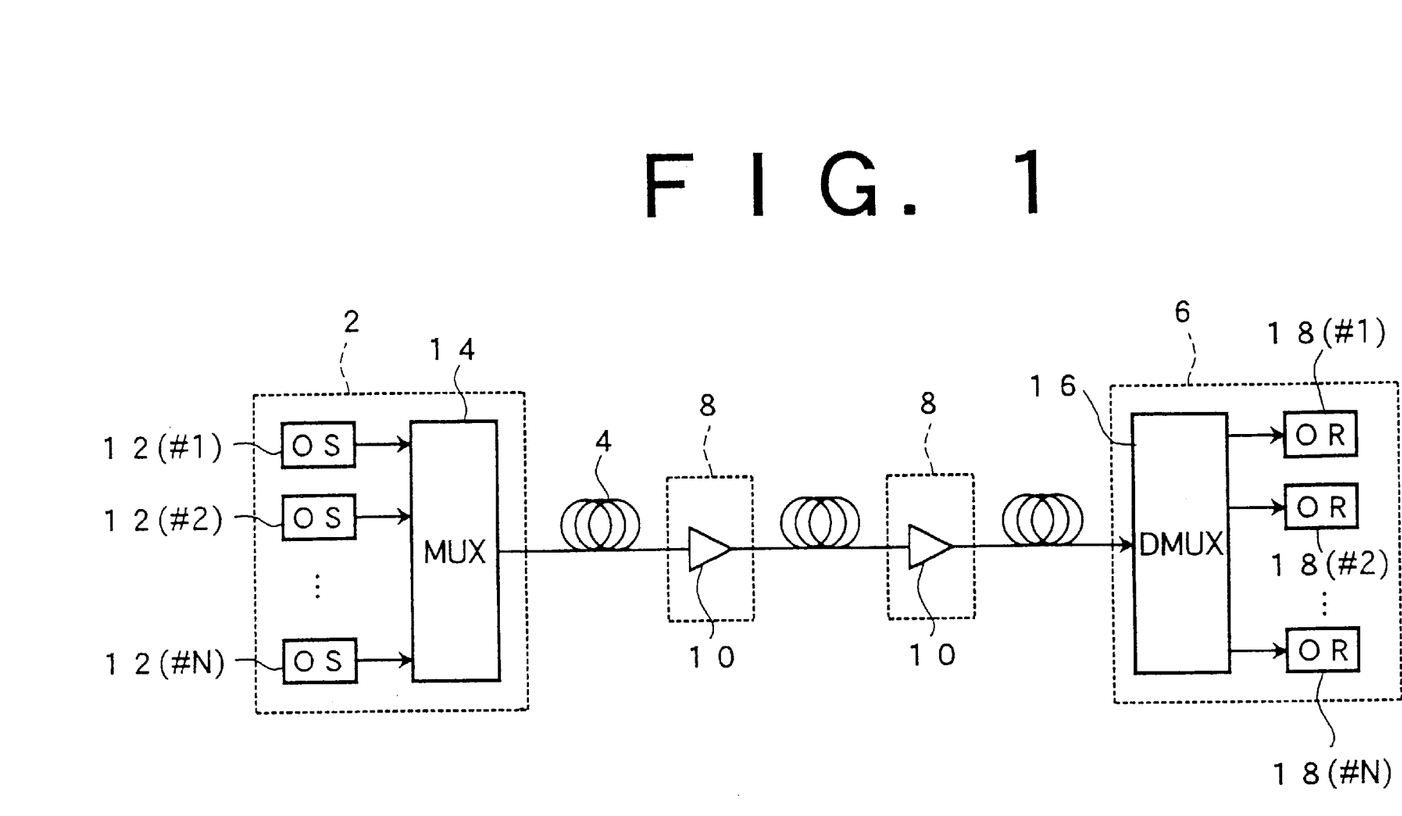
FIG. 1 is a block diagram showing an optical-fiber communication system to which the present invention is applicable.

FIG. 1 is a block diagram showing an optical-fiber communication system to which the present invention is applicable. As shown in the figure, the optical-fiber communication system comprises a first terminal-station apparatus 2 for outputting a WDM signal light, an optical-fiber transmission line 4 for transmitting the WDM signal light output by the first terminal-station apparatus 2, and a second terminal-station apparatus 6 for receiving the WDM signal light transmitted by the optical-fiber transmission line 4. The first terminal-station apparatus 2 includes a plurality of optical transmitters or optical senders (OS) 12(#1 to #N), and an optical multiplexer (MUX) 14. The multiplexer 14 has a plurality of input ports each connected to one of the optical transmitters 12(#1 to #N), and at least one output port connected to the optical-fiber transmission line 4. The optical multiplexer 14 carries out wavelength division multiplexing on a plurality of optical signals supplied thereto, outputting a WDM signal light.

At locations on the optical-fiber transmission line 4, a plurality of optical repeaters 8 for compensating the WDM signal light for attenuation incurred along the optical-fiber transmission line 4. Each of the optical repeaters 8 has an optical amplifier 10 for amplifying the WDM signal light. The optical amplifier 10 comprises an optical amplifying medium for receiving the WDM signal light and means for pumping the optical amplifying medium. As the optical amplifying medium, an optical fiber doped with an element of the rare-earth group can be used. In this case, the pumping means comprises a pump light source for outputting a pump light with a predetermined wavelength and an optical circuit for supplying the pump light to the doped optical fiber by way of at least one of the first and second ends of the doped optical fiber. As a dopant, Er (erbium) is an appropriate element for amplification of optical signals in a wavelength band of 1.55 $\mu$m. In this case, the 0.98 or 1.48 $\mu$m band is selected as the wavelength of the pump light. The optical amplifying medium can also be implemented by a semiconductor chip. In this case, the pumping means includes means for injecting a current to the semiconductor chip.

The second terminal-station apparatus 6 includes an optical demultiplexer (DMUX) 16 for demultiplexing the WDM signal light received thereby into optical signals for their respective channels, and a plurality of optical receivers (ORs) 18(#1 to #N) for receiving the respective optical signals.

In an optical-fiber communication system to which the WDM is applied as described above, the transmission capacity per line of the optical-fiber transmission line can be increased by increasing the number of multiplexed channels. In addition, by providing at least one optical amplifier on the optical-fiber transmission line, the transmission distance can be lengthened.

Figure 2A:
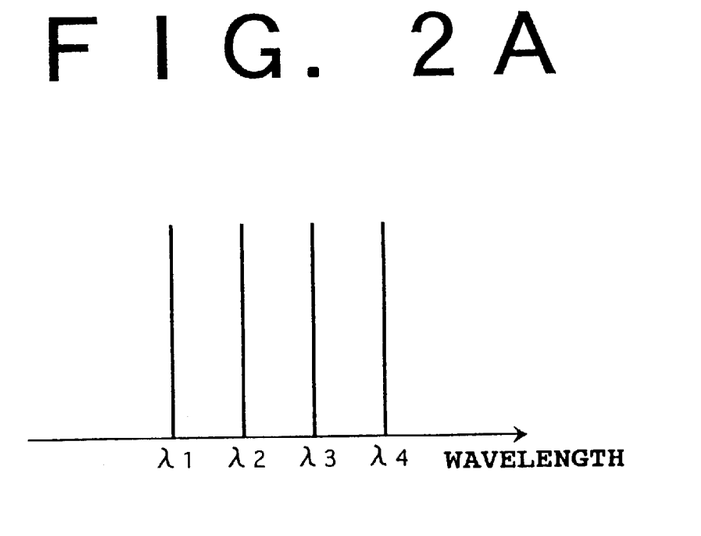
FIGS. 2A and 2B are explanatory diagrams used for explaining generation of crosswalk in WDM (Wavelength Division Multiplexing)
Figure 2B:
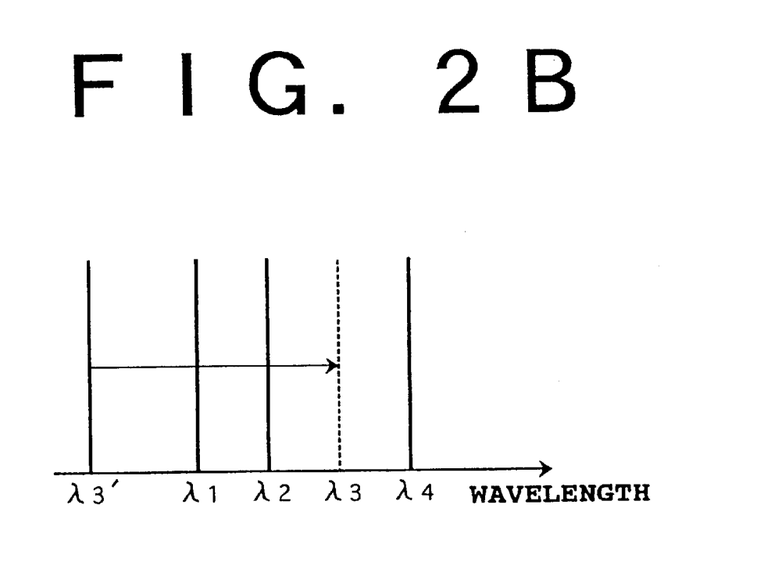

FIGS. 2A and 2B are explanatory diagrams used for describing the generation of crosswalk among channels in a WDM system. In order to make the explanation simple, the number of channels undergoing the WDM is 4 as shown in FIG. 2A. Wavelengths assigned to the four channels are $\lambda_1$ to $\lambda_4$ satisfying the relation $\lambda_1 < \lambda_2 < \lambda_3 < \lambda_4$. Now, due to a trouble occurring in the optical transmitter or a cold start, let the wavelength of the third channel change from $\lambda_3$ to $\lambda_3'$ which is shorter than $\lambda_1$ ($\lambda_3' < \lambda_1$) and the wavelengths assigned to the other channels remain the same as they are as shown in FIG. 2B. In order to solve the problem, the wavelength of the third channel is adjusted to restore it to the original value $\lambda_3$. During the adjustment, however, there are times at which the wavelength of the third channel coincides with the wavelengths $\lambda_1$ and $\lambda_2$ of the first and second channels respectively. At that time, crosswalk occurs in the first and second channels, most likely causing a data error.

Figure 3:
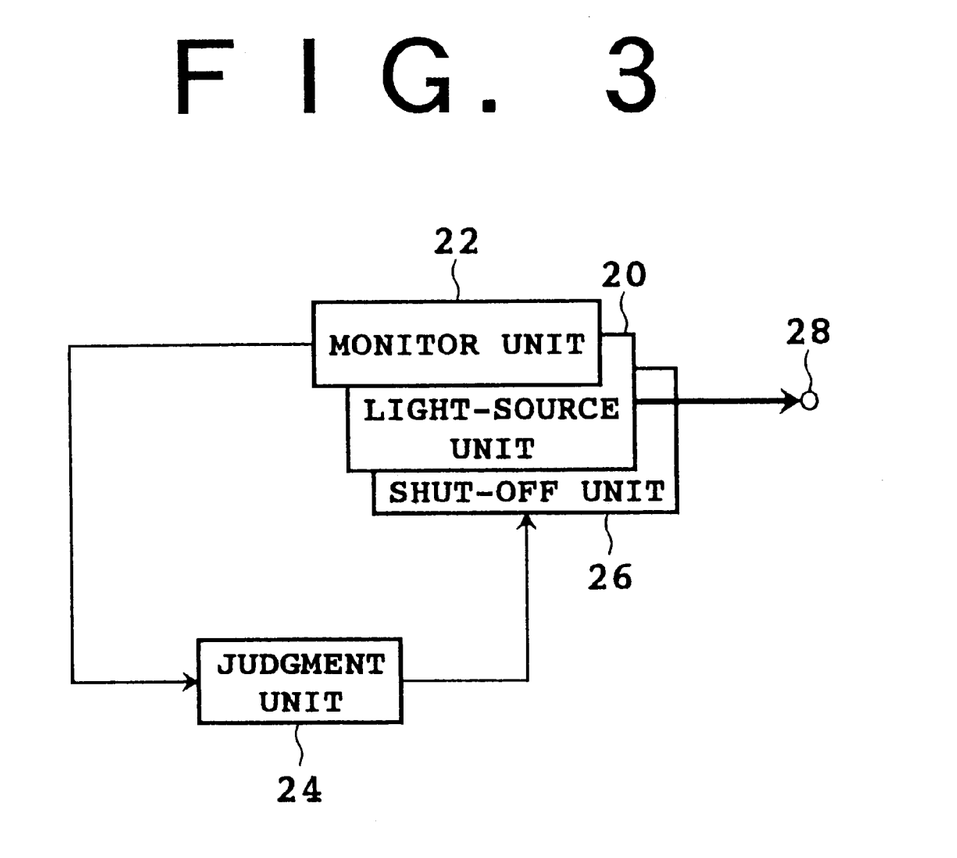
FIG. 3 is a block diagram showing a basic configuration of the optical transmitter according to the present invention.

FIG. 3 is a block diagram showing a basic configuration of the optical transmitter according to the present invention. As shown in the figure, the optical transmitter comprises a light-source unit 20, a monitor unit 22, a judgment unit or determiner 24 and a shut-off unit 26. The light-source unit 20 generates an optical signal. The monitor unit 22 monitors a parameter determining or depending on the wavelength of the optical signal. The judgment unit 24 determines or forms a judgment as to whether or not the monitored parameter satisfies a predetermined condition. The shut-off unit 26 shuts off the optical signal in case the monitored parameter does not satisfy the predetermined condition. An optical signal not shut off by the shut-off unit 26 is output from an output port 28.

The optical transmitter shown in FIG. 3 or optical transmitters implemented by a variety of embodiments to be described below can be used as the optical transmitters 12 (#1 to #N) shown in FIG. 1. Including the shut-off unit 26, the optical transmitter shuts off an optical signal of a channel associated with the optical transmitter when the wavelength of the optical signal is found beyond a range of allowable wavelengths assigned to the channel, preventing crosswalk from occurring among channels.

Figure 4:
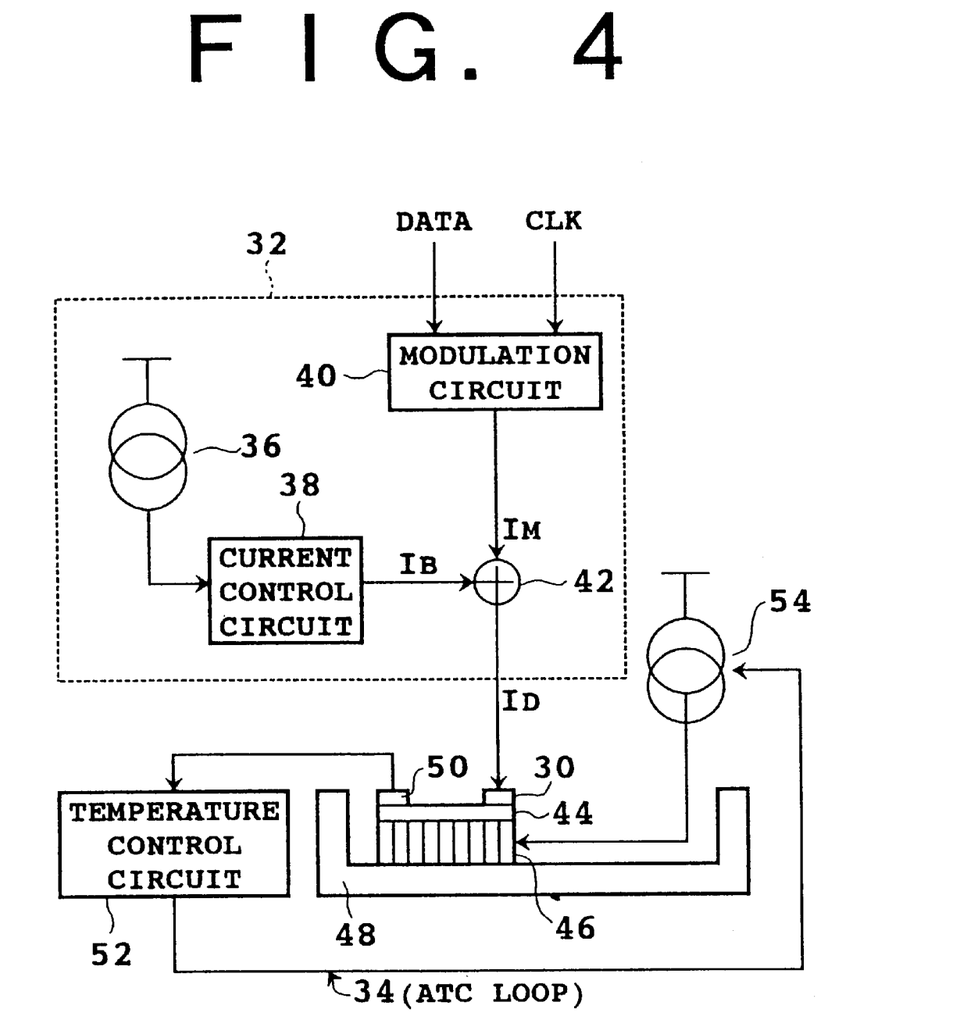
FIG. 4 is a block diagram showing a light-source unit applicable to the present invention.

FIG. 4 is a block diagram showing a light-source unit applicable to the present invention. The light-source unit shown in FIG. 4 is applicable to the basic configuration shown in FIG. 3 and the embodiments to be described below. As shown in the FIG. 4, the light-source unit comprises a laser diode 30, a driving unit 32 for supplying a driving current $I_D$ to the laser diode 30 and an ATC (Automatic Temperature Control) loop 34 for keeping the temperature of the laser diode 30, at a constant value. The driving unit 32 comprises a current source 36, a current control circuit 38 connected to the current source 36 for generating a controlled DC bias current $I_B$, a modulation circuit 40 for generating a modulation current $I_M$ by using a clock signal (CLK) and a data signal (DATA) supplied to the modulation circuit 40, and an adder 42 for generating the driving current $I_D$ by superposing the modulation current $I_M$ on the bias current $I_B$. By supplying the laser diode 30 with the driving current $I_D$ generated in this way, an intensity-modulated optical signal can be output from the laser diode 30.

The laser diode 30 is fixed on the upper surface of a base 44. The lower surface of the base 44 is fixed on the inner wall of a housing 48 through a Peltier device 46. The ATC loop 34 comprises a thermistor 50 provided at a location in close proximity to the laser diode 30 on the base 44 for monitoring the temperature of the laser diode 30, a temperature control circuit 52 for outputting a control signal for keeping the temperature monitored by the thermistor 50 at a constant value, and a variable-current source 54 for supplying a current controlled by the control signal to the Peltier device 46. The Peltier device 46 plays a role of letting heat corresponding to the current provided thereto flow from the base 44 to the housing 48. Thus, if the Peltier device 46 has a proper cooling capacity for heat dissipated by the laser diode 30, the laser diode 30 is cooled so that the temperature thereof is maintained at virtually a constant value. As a result, the oscillation wavelength of the laser diode 30 is kept at a constant value according to the principle of operation of the ATC loop 34.

Figure 5:
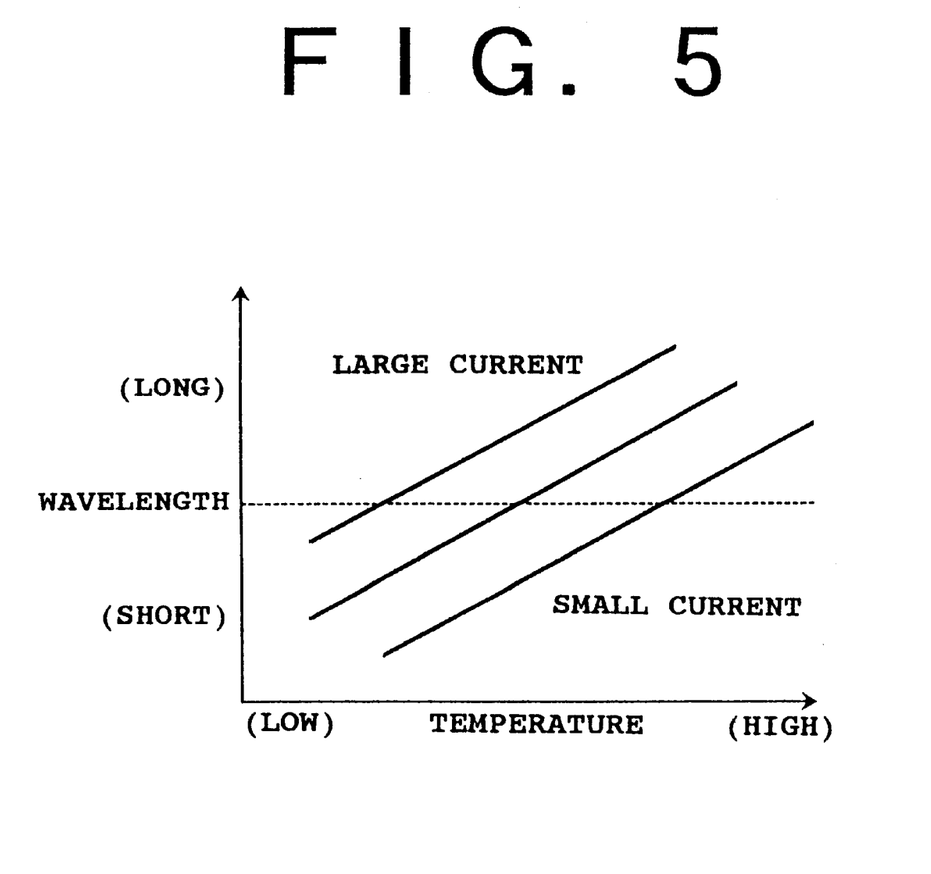
FIG. 5 is a diagram showing typical graphs representing characteristics of a laser diode.

FIG. 5 is a diagram showing typical graphs representing characteristics of the laser diode 30. The vertical and horizontal axes of the figure represent the oscillation wavelength and the temperature respectively of the laser diode 30. As shown in the figure, the oscillation wavelength of the laser diode increases with the temperature thereof. The characteristics also indicate that the oscillation wavelength is shifted upward as the level of the driving current, that is, the absolute value of the driving current, is raised.

Figure 6:
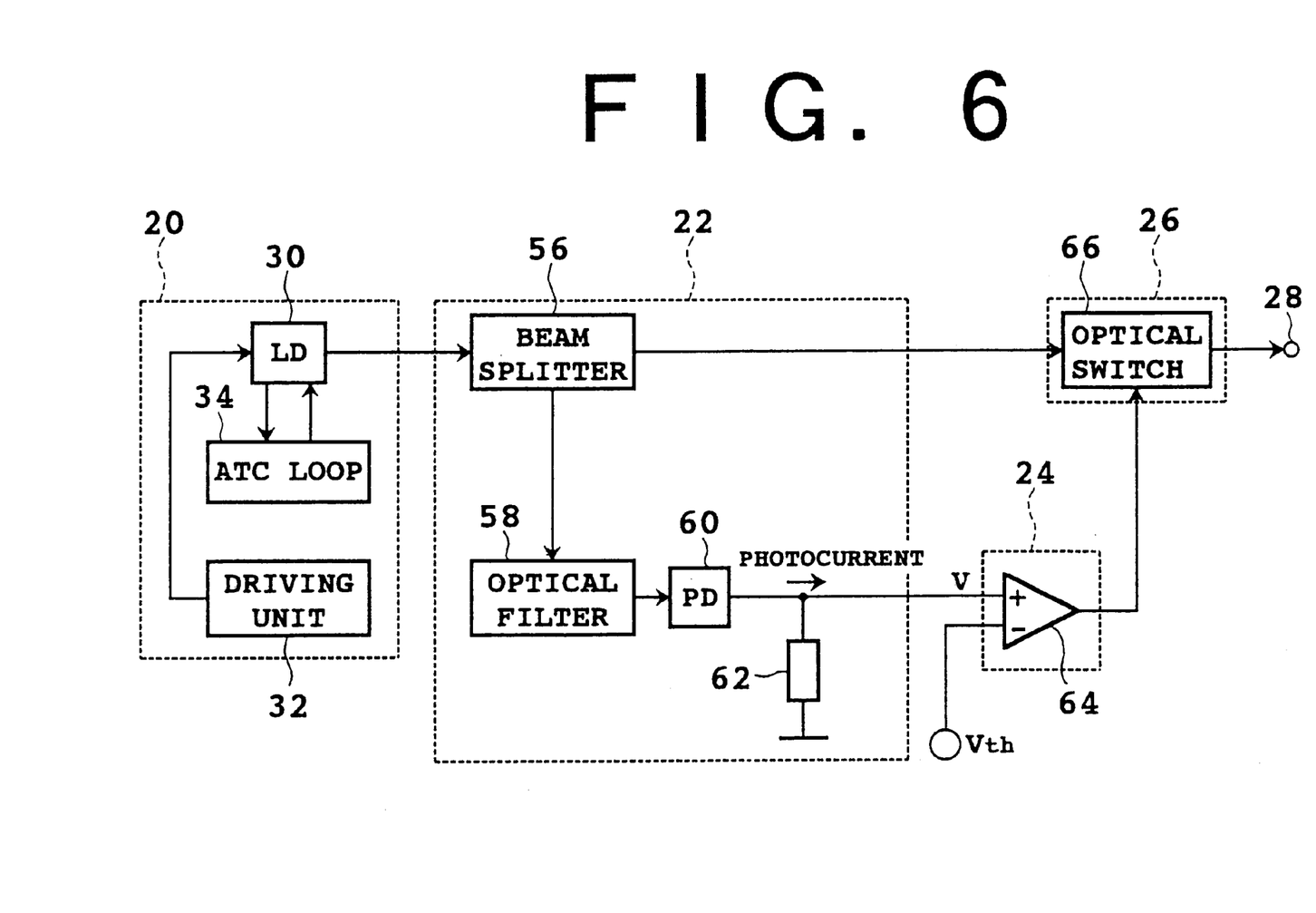
FIG. 6 is a block diagram showing a first embodiment of the optical transmitter according to the present invention.

FIG. 6 is a block diagram showing a first embodiment of the optical transmitter according to the present invention. As shown in the figure, the light-source unit 20 comprises a laser diode 30, a driving unit 32, and an ATC loop 34, like as shown in FIG. 4. The monitor unit 22 comprises a beam splitter 56 for splitting the optical signal output by the laser diode 30 into a main beam and an auxiliary beam, an optical band-pass filter 58 for filtering the auxiliary beam output by the beam splitter 56, and a photo detector (PD) 60 for receiving a beam passing through the optical band-pass filter 58. The photo detector 60 generates a photocurrent representing the power of the beam supplied to the photo detector 60. A resistor 62 is connected to the photo detector 60 for converting the photocurrent into a monitor voltage V corresponding to the photocurrent.

The judgment unit 24 includes a comparator 64 for comparing the monitor voltage V generated by the monitor unit 22 with a reference voltage (or a threshold voltage) $V_{th}$. The shut-off unit 26 includes an optical switch 66 provided between the beam splitter 56 and the output port 28. The optical switch 66 is used for turning on and off the main beam generated by the beam splitter 56 in accordance with a signal output by the comparator 64. More concretely, when the monitor voltage V is found greater than the reference voltage $V_{th}$, the optical switch 66 is turned on, passing on the optical signal (strictly speaking, the main beam) to the output port 28. When the monitor voltage V is found equal to or smaller than the reference voltage $V_{th}$, on the other hand, the optical switch 66 is turned off, cutting off the optical signal.

Figure 7:
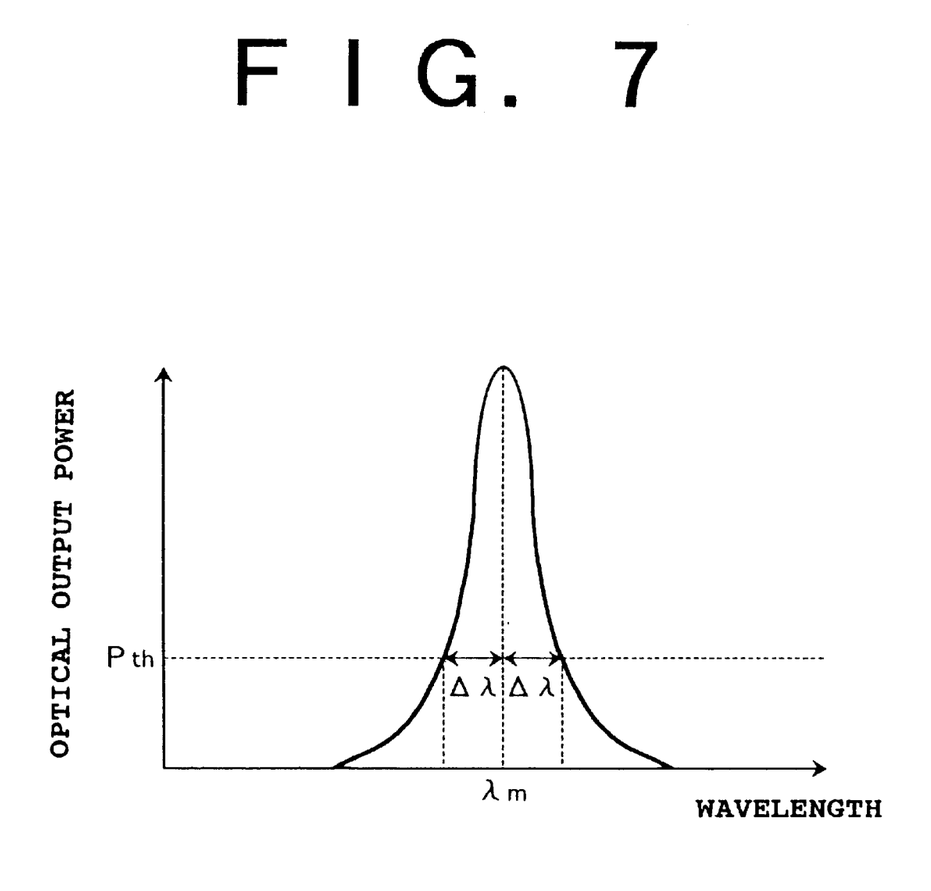
FIG. 7 is an explanatory diagram used for describing the characteristic of an optical band-pass filter employed in the first embodiment shown in FIG. 6.

As shown in FIG. 7, the optical band-pass filter 58 has a characteristic exhibiting a maximum transmittivity at a target wavelength $\lambda_m$ of the optical signal. The vertical and horizontal axes of the graph shown in the figure are the optical output power, that is, the power of the beam passing through the optical band-pass filter 58, and the wavelength, respectively. Let the range of wavelengths with no fear of having a crosswalk effect on other channels be $\lambda_m \pm \Delta\lambda$. In this case, the reference voltage $V_{th}$ is set at such a threshold value that the optical power $P_{th}$ at the wavelengths $\lambda_m - \Delta\lambda$ and $\lambda_m + \Delta\lambda$ corresponds to the threshold value. By setting the reference voltage $V_{th}$ at such a value, the optical switch 66 is turned on if the power of the beam passing through the optical band-pass filter 58 is greater than $P_{th}$ but turned off if the power of the beam passing through the optical band-pass filter 58 is equal to or smaller than $P_{th}$.

It is thus obvious that, in the first embodiment, the parameter monitored by the monitor unit 22 is the power of the beam passing through the optical band-pass filter 58, that is, the monitor voltage V, and the condition predetermined for use by the judgment unit 24 in forming a judgment is that the power of the beam passing through the optical band-pass filter 58 is greater than the threshold value $P_{th}$ or the monitor voltage V is higher than $V_{th}$.

In accordance with the operations of the monitor unit 22 and the judgment unit 24 described above, the wavelength of an optical signal output from the output port 28 is limited to those in a range that does not have an effect on other channels. As a result, by employing this optical transmitter in a WDM terminal-station apparatus or a WDM optical communication system, it is possible to prevent crosswalk from occurring among channels.

Figure 8A:
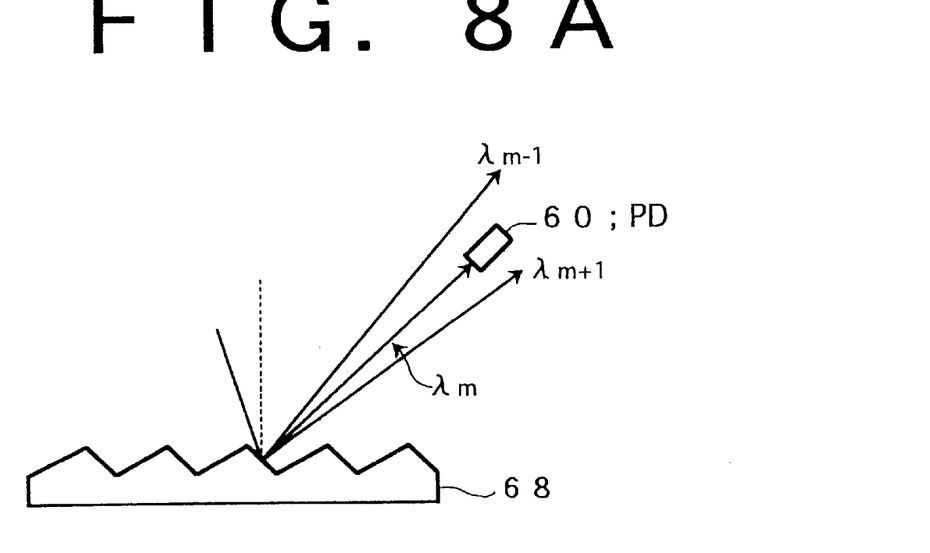
FIGS. 8A and 8B are explanatory diagrams each used for describing a spectroscope serving as a substitute for the optical band-pass filter.
Figure 8B:
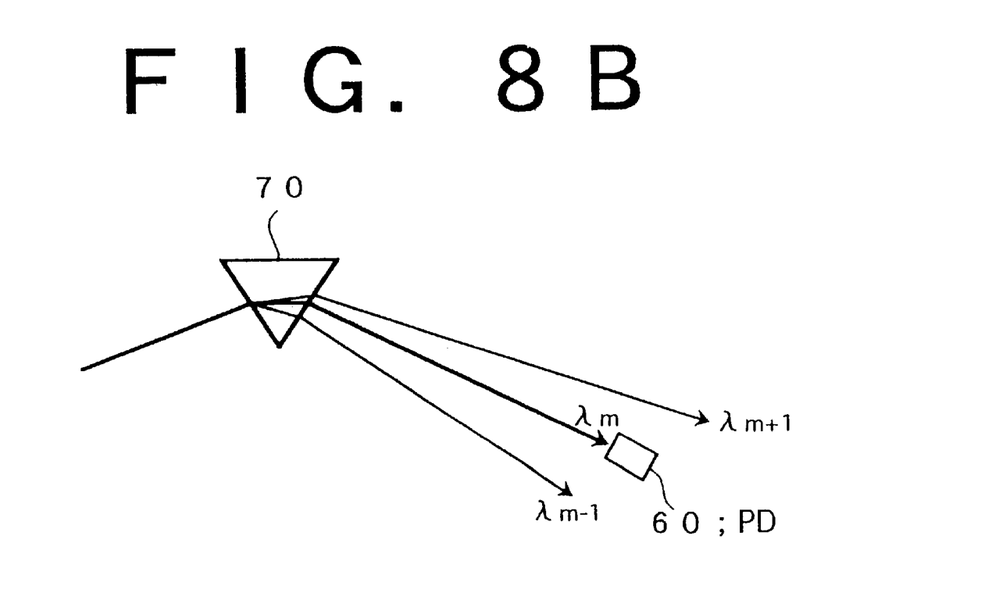

FIGS. 8A and 8B are each a diagram showing a typical spectroscope capable of serving as a substitute for the optical band-pass filter 58 of the monitor unit 22.

As shown in FIG. 8A, the first spectroscope has a reflective diffraction grating 68 for providing angle dispersion to the auxiliary beam coming from the beam splitter 56. The beam with angle dispersion is supplied to the photo detector 60. To describe it concretely, the relation between the positions of the photo detector 60 and the diffraction grating 68 is adjusted so that a light beam with angle dispersion having the target wavelength $\lambda_m$ is applied to the center of the receiving surface of the photo detector 60. On the other hand, a beam with a wavelength $\lambda_{m+1}$ ($>\lambda_m+\Delta\lambda$) and a beam with a wavelength $\lambda_{m-1}$ ($<\lambda_m-\Delta\lambda$) do not enter the receiving surface of the photo detector 60. That is to say, the spectroscope shown in FIG. 8A has an operating characteristic equivalent to that shown in FIG. 7.

As shown in FIG. 8B, the second spectroscope has a prism 70 for providing angle dispersion to the auxiliary beam coming from the beam splitter 56. Much like the first spectroscope, the beam with angle dispersion is supplied to the photo detector 60. To describe it concretely, the relation between the positions of the photo detector 60 and the prism 70 is adjusted so that a light beam with angle dispersion having the target wavelength $\lambda_m$ is applied to the center of the receiving surface of the photo detector 60. On the other hand, a beam with a wavelength $\lambda_{m+1}$ ($>\lambda_m+\Delta\lambda$) and a beam with a wavelength $\lambda_{m-1}$ ($<\lambda_m-\Delta\lambda$) do not enter the receiving surface of the photo detector 60. That is to say, the spectroscope shown in FIG. 8B also has an operating characteristic equivalent to that shown in FIG. 7.

Figure 9:
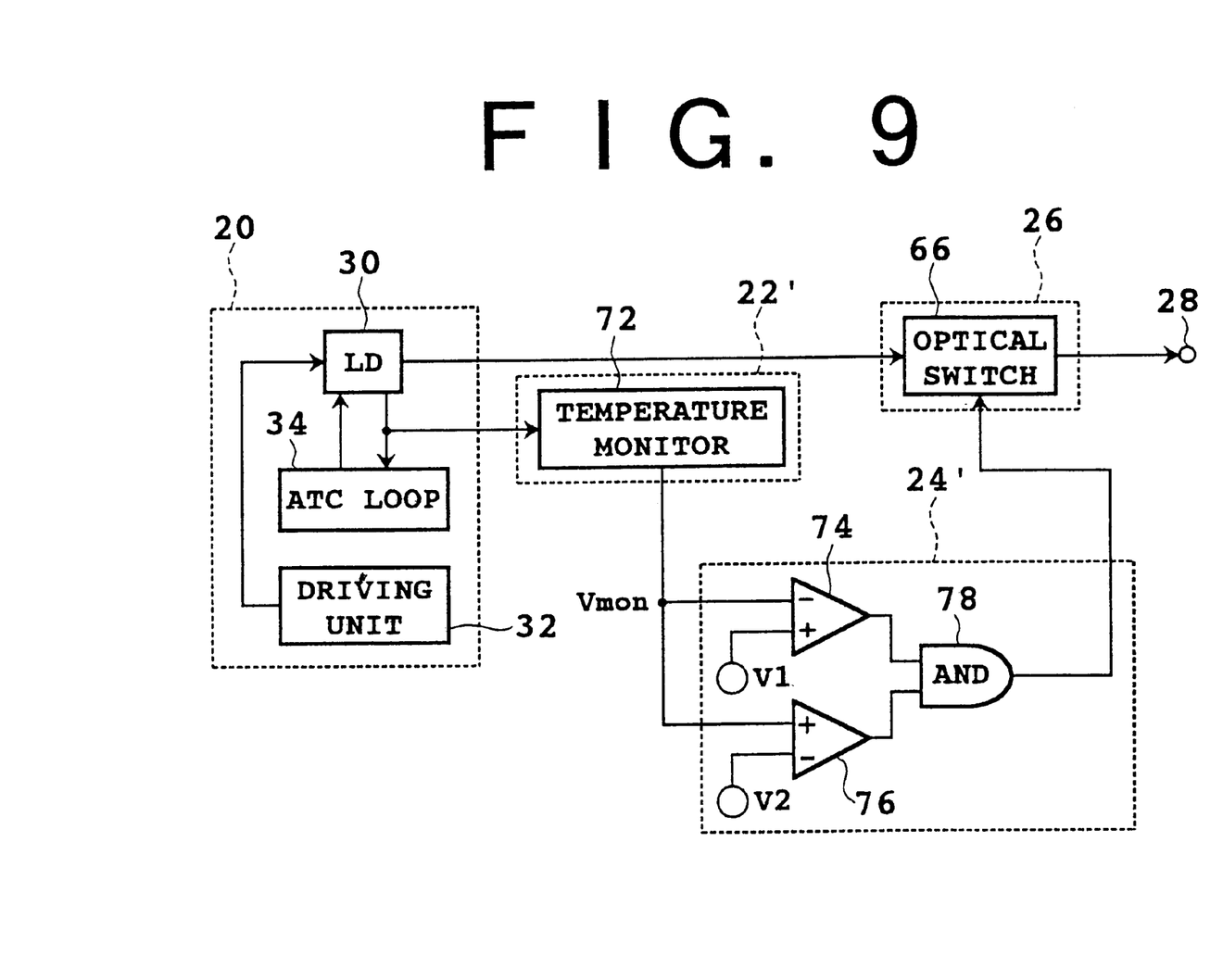
FIG. 9 is a block diagram showing a second embodiment of the optical transmitter according to the present invention.

FIG. 9 is a diagram showing a second embodiment of the optical transmitter according to the present invention. Due to the fact that the wavelength of an optical signal output by the laser diode 30 is determined by the temperature of the laser diode 30, in the second embodiment, the temperature of the laser diode 30 is selected as a parameter to be monitored. More concretely, there is provided a monitor unit 22' including a temperature monitor 72 for generating a monitor voltage $V_{mon}$ representing the temperature of the laser diode 30. Since the ATC loop 34 includes a thermistor 50 shown in FIG. 4 for detecting the temperature of the laser diode 30, by supplying a signal output by the thermistor 50 to a temperature monitor 72, the monitor voltage $V_{mon}$ can be obtained with ease.

There is also provided a judgment unit 24' for forming a judgment as to whether the monitor voltage $V_{mon}$ is in a range between a first reference voltage (or a first threshold voltage) $V_1$ and a second reference voltage (or a second threshold voltage) $V_2$ where $V_2<V_1$. The judgment unit 24' comprises a first comparator 74 for comparing the monitor voltage $V_{mon}$ with the first reference voltage $V_1$, a second comparator 76 for comparing the monitor voltage $V_{mon}$ with the second reference voltage $V_2$, and an AND circuit 78 for outputting the logical product of signals output by the first and second comparators 74 and 76.

The judgment unit 24' works as follows. If $V_1<V_{mon}$, the output level of the first comparator 74 is low but the output level of the second comparator 76 is high. As a result, the output level of the AND circuit 78 is low. If $V_2 \leq V_{mon} \leq V_1$, on the other hand, the output level of the first comparator 74 is high and the output level of the second comparator 76 is also high as well. As a result, the output level of the AND circuit 78 is high. If $V_{mon}<V_2$, on the contrary, the output level of the first comparator 74 is high but the output level of the second comparator 76 is low. As a result, the output level of the AND circuit 78 is low. The high and low output levels of the AND circuit 78 turn on and off respectively an optical switch 66.

Thus, only when the condition $V_2 \leq V_{mon} \leq V_1$ is satisfied, the optical signal is output from the output port 28. This condition is set so that the wavelength of the optical signal is in an allowable range. More concretely, since the wavelength of the optical signal increases with the temperature of the laser diode 30, $V_1$ and $V_2$ are set at values that correspond to maximum and minimum allowable wavelengths respectively.

By employing the monitor unit 22' and the judgment unit 24' as described above, an optical signal is shut off if the wavelength of the optical signal is outside an allowable range. As a result, by employing this optical transmitter as each of the optical transmitters 12(#1 to #N) shown in FIG. 1, it is possible to prevent crosswalk from occurring among channels.

Figure 10A:
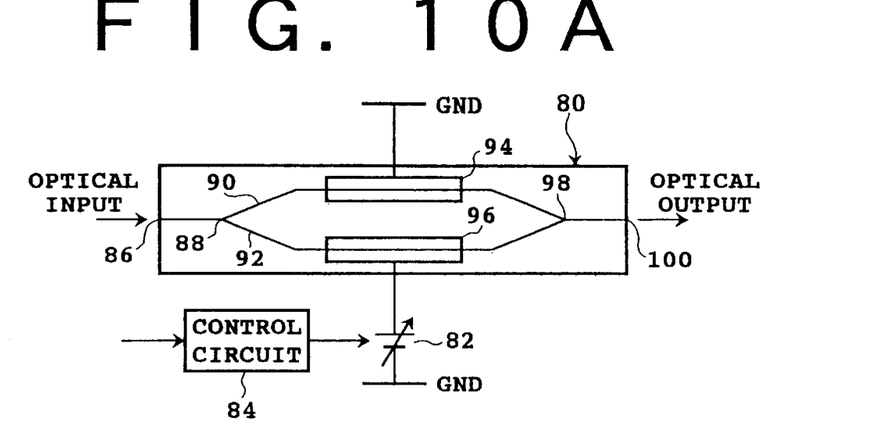
FIGS. 10A, 10B, and 10C are diagrams each showing an optical switch applicable to the present invention.
Figure 10B:
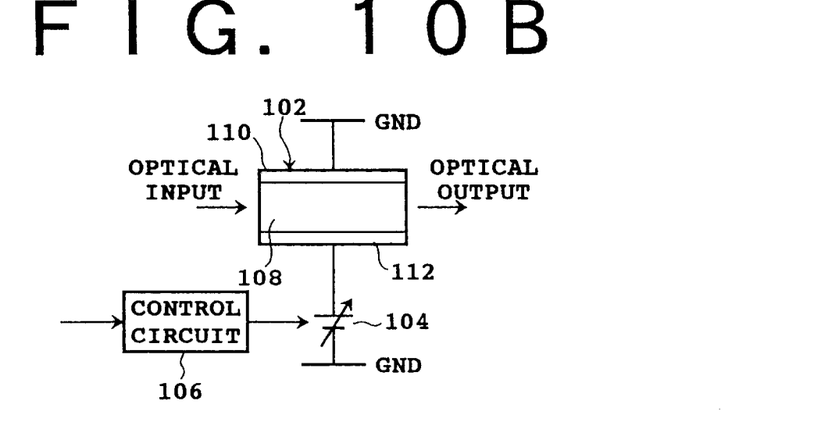
Figure 10C:
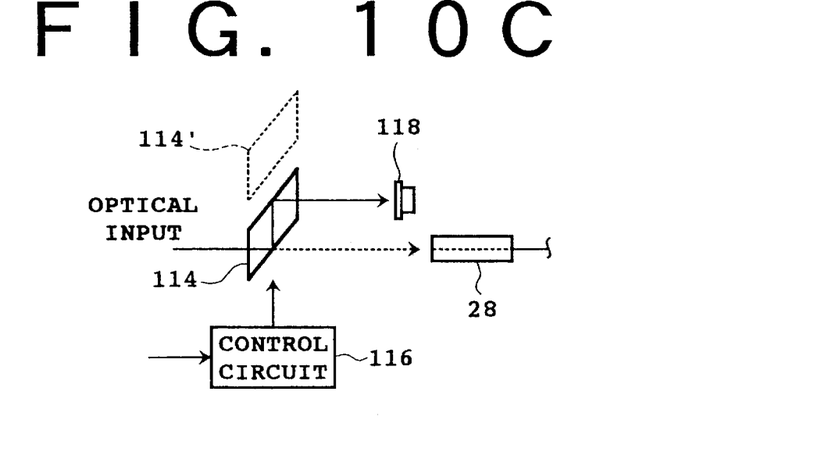

FIGS. 10A, 10B and 10C are each a diagram showing a typical optical switch applicable to the present invention.

As shown in FIG. 10A, the first optical switch comprises a Mach-Zehnder optical modulator 80, a variable-voltage supply 82, and a control circuit 84. The Mach-Zehnder optical modulator 80 comprises an input port 86, a Y-shaped branch 88 connected to the input port 86 for splitting an optical signal supplied from the input port 86 into first and second beams, first and second paths 90 and 92 connected to the Y-shaped branch 88 for propagating the first and second beams respectively, first and second electrodes 94 and 96 operating on the first and second paths 90 and 92 receptively so as to provide a difference in phase between the first and second beams, a Y-shaped branch 98 connected to the first and second paths 90 and 92 for merging the first and second beams with the difference in phase provided thereto, and an output port 100 connected to the Y-shaped branch 98. The electrode 94 is connected to the ground while the electrode 96 is connected to the variable-voltage supply 82 for applying a voltage to the electrode 96. The level of the voltage applied to the electrode 96 is controlled by the control circuit 84 in accordance with a signal output by the judgment unit 24 (24'). When an electric field is provided between the electrodes 94 and 96 so that the first and second beams have the same phase, the first and second beams are added to each other, mutually enforcing one another at the Y-shaped branch 98. As a result, this state is equivalent to a state in which the optical switch is turned on. When such an electric field is provided between the electrodes 94 and 96 that the first and second beams have phases opposite to each other, on the other hand, the first and second beams mutually cancel one another at the Y-shaped branch 98. As a result, this state is equivalent to a state in which the optical switch is turned off.

As shown in FIG. 10B, the second optical switch comprises an electric-field-absorption optical modulator 102, a variable-voltage supply 104, and a control circuit 106. The electric-field-absorption optical modulator 102 comprises an absorbing layer 108 for absorbing an optical signal and electrodes 110 and 112 for providing an electric field to the absorbing layer 108. The electrode 110 is connected to the ground while the electrode 112 is connected to the variable-voltage supply 104 for applying a voltage to the electrode 112. The level of the voltage applied to the electrode 112 is controlled by the control circuit 106 in accordance with a signal output by the judgment unit 24 (24'). Since the optical-signal absorptance of the absorbing layer 108 varies in accordance with an electric field provided between the electrodes 110 and 112, by adjusting the variable-voltage supply 104, the optical signal propagating through the optical switch can be turned on and off.

As shown in FIG. 10C, the third optical switch comprises a movable prism 114 for mechanically switching the optical path of the optical signal and a control circuit 116 for controlling a driving mechanism of the movable prism 114 in accordance with a signal output by the judgment unit 24 (24'). It should be noted that the driving mechanism itself is not shown in the figure. When the movable prism 114 is located at a position indicated by a solid line in the figure, the optical path of the supplied optical signal is changed by the movable prism 114 to a direction leading to an optical terminator 118 for absorbing the optical signal. In this state, the optical switch is turned off. When the movable prism 114 is located at a position indicated by reference numeral 114' in the figure, on the other hand, the optical path of the supplied optical signal is lead to the output port 28 as it is. In this state, the optical switch is turned on.

It should be noted that, while the present invention has been described with reference to embodiments wherein the shut-off unit 26 includes the optical switch 66 for turning on and off the optical signal, the description is not intended to be construed in a limiting sense. That is to say, it is to be understood that the subject matter encompassed by the present invention is not limited to the embodiments described above. As a matter of fact, the present invention can be implemented by an embodiment without employing an optical switch. Such embodiments are explained by referring to FIGS. 11 and 12.

Figure 11:
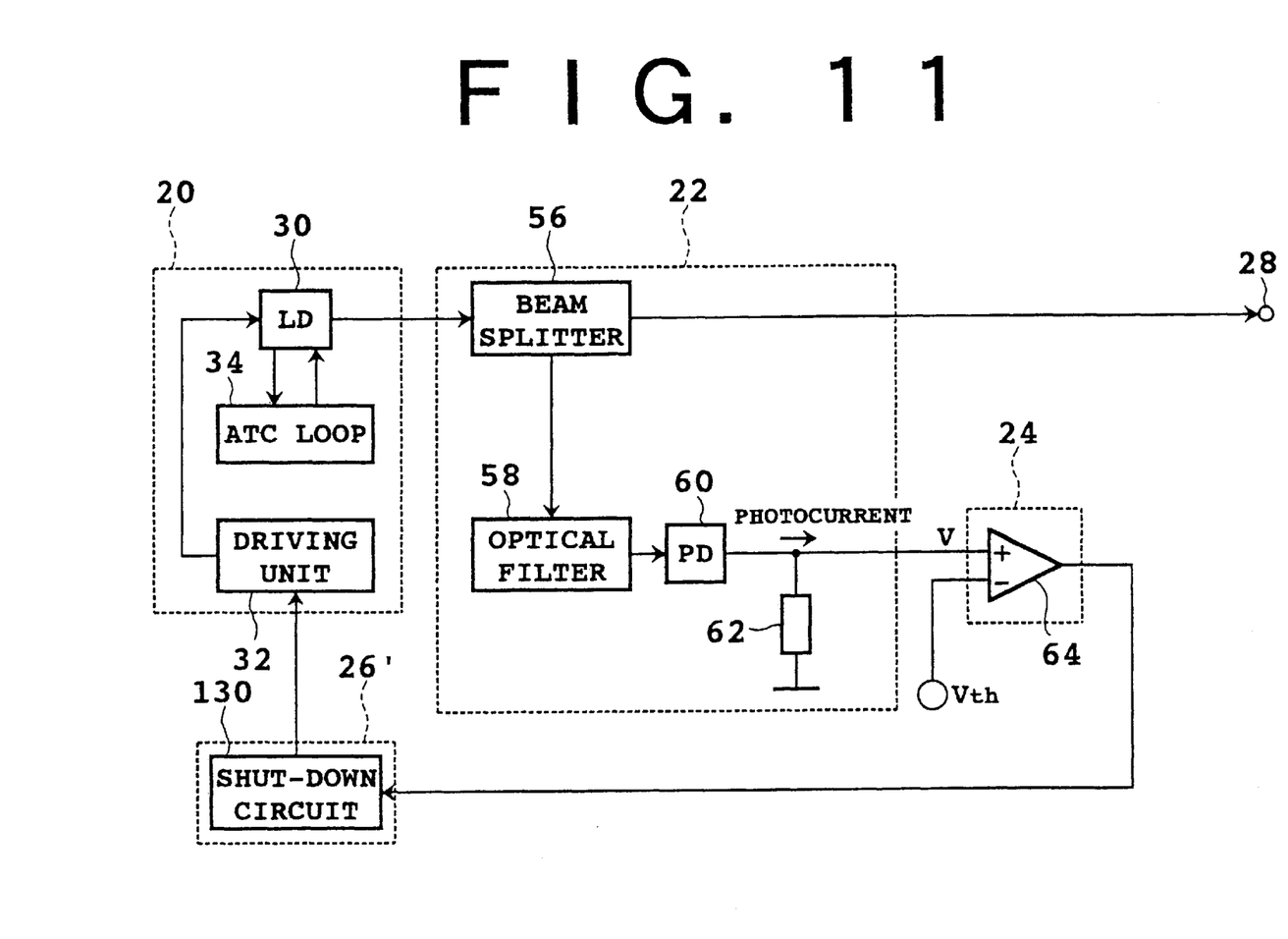
FIG. 11 is a block diagram showing a third embodiment of the optical transmitter according to the present invention.

FIG. 11 is a block diagram showing a third embodiment of the optical transmitter according to the present invention. As shown in the figure, the light-source unit 20, the monitor unit 22, and the judgment unit 24 shown in FIG. 6 are employed but the optical switch 66 is not used. As a substitute for the optical switch 66, the driving unit 32 is provided with a shut-off unit 26' which includes a shut-down circuit 130. The shut-down circuit 130 controls the supply of a driving current to the laser diode 30 from the driving unit 32 in accordance with a signal output by the judgment unit 24.

More concretely, when the monitor voltage V is equal to or greater than the reference voltage $V_{th}$, the wavelength of the optical signal is judged to be in an allowable range. In this case, the shut-down circuit 130 controls the driving unit 32 so that the driving unit 32 supplies the driving current normally to the laser diode 30. When the monitor voltage V is smaller than the reference voltage $V_{th}$, on the other hand, the wavelength of the optical signal is judged to be outside the allowable range. In this case, the shut-down circuit 130 controls the driving unit 32 so that the driving unit 32 reduces the magnitude of the driving current supplied to the laser diode 30. Here, the reason as to why the driving current is merely reduced in magnitude instead of being put completely to a zero is that, by merely reducing the magnitude of the driving current, an operation can be carried out with ease to restore the driving current to its original value once the wavelength of the optical signal has been put back in the allowable range.

Figure 12:
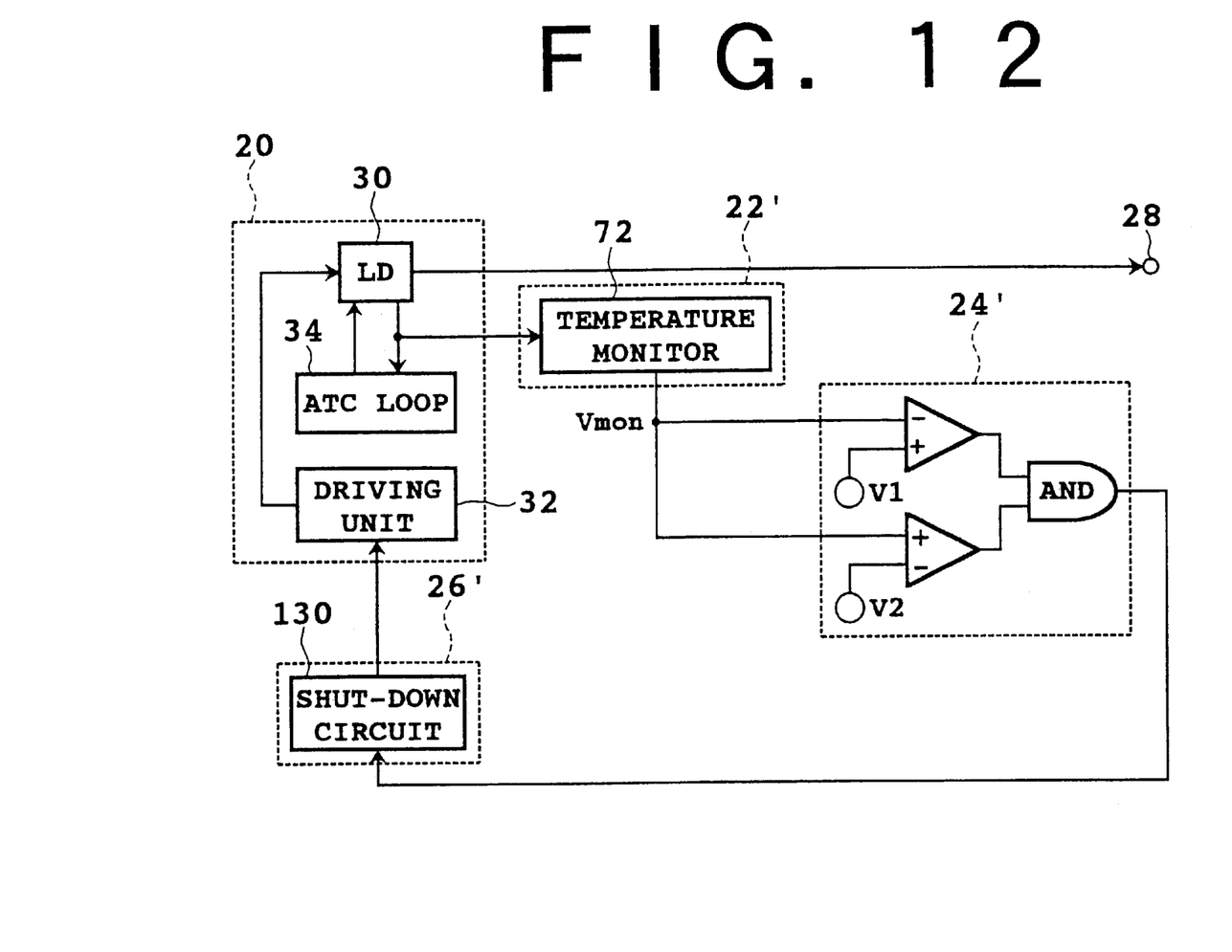
FIG. 12 is a block diagram showing a fourth embodiment of the optical transmitter according to the present invention.

FIG. 12 is a block diagram showing a fourth embodiment of the optical transmitter according to the present invention. As shown in the figure, the fourth embodiment is obtained by modifying the third embodiment shown in FIG. 11 in the same way as the first embodiment shown in FIG. 6 is modified to give the second embodiment shown in FIG. 9. That is to say, the light-source unit 20 and the shut-off unit 26' are common to the third and fourth embodiments but the monitor unit 22 and the judgment unit 24 employed in the third embodiment are modified to a monitor unit 22' and a judgment unit 24' respectively. Since the operation of the fourth embodiment can be understood with ease from the embodiments described so far, the explanation of the operation of the fourth embodiment is omitted.

According to the third or fourth embodiment, the wavelength of the optical signal can be put in an allowable range. As a result, by applying the third or fourth embodiment to the optical-fiber communication system shown in FIG. 1, crosswalk can be prevented from occurring among channels.

It should be noted that, while the present invention has been described with reference to illustrative embodiments wherein direct modulation is carried out on the laser diode 30 as shown in FIG. 4, the description is not intended to be construed in a limiting sense. That is to say, it is to be understood that the subject matter encompassed by the present invention is not limited to the embodiments described above. For example, indirect modulation can also be carried out on the laser diode 30 by using an external optical modulator.

What is claimed is:

1. An optical transmitter comprising:
   a light-source unit for generating an optical signal;
   a monitor for monitoring a parameter depending on a wavelength of said optical signal;
   a determiner for determining as to whether or not said monitored parameter satisfies a predetermined condition; and
   a shut-off unit for shutting off said optical signal in case said monitored parameter does not satisfy said predetermined condition, wherein
   said monitor comprises
      a beam splitter for splitting said optical signal into a main beam and an auxiliary beam,
      an optical band-pass filter for being supplied with said auxiliary beam, and
      a photo detector for detecting a beam passing through said optical band-pass filter,
   said parameter is a power of said beam passing through said optical band-pass filter, and
   said predetermined condition is that said power of said beam passing through said optical band-pass filter is larger than a threshold value.

2. An optical transmitter according to claim 1, wherein said shut-off unit includes an optical switch for turning on and off said main beam.

3. An optical transmitter according to claim 1, wherein:
   said light-source unit includes a laser diode and means for supplying a driving current to said laser diode; and
   said shut-off unit includes means for controlling supply of said driving current to said laser diode.

4. An optical transmitter according to claim 1, wherein said light-source unit includes a laser diode.

5. An optical transmitter according to claim 4, wherein:
   said light-source unit further includes means for monitoring a temperature of said laser diode;
   said monitor includes means for generating a monitor voltage representing said temperature of said laser diode; and
   said predetermined condition is that a magnitude of said monitored voltage is between first and second threshold values.

6. An optical transmitter according to claim 5, wherein said shut-off unit includes an optical switch for turning on and off said main beam.

7. An optical transmitter according to claim 5, wherein:
   said light-source unit further includes means for supplying a driving current to said laser diode; and
   said shut-off unit includes means for controlling supply of said driving current to said laser diode.

8. An optical transmitter according to claim 1, wherein:
   said monitor comprises:
      a beam splitter for splitting said optical signal into a main beam and an auxiliary beam;
      means for providing an angle dispersion to said auxiliary beam; and
      a photo detector for detecting said auxiliary beam having said angle dispersion; and
      said parameter is a signal output by said photo detector.

9. An optical transmitter according to claim 1, wherein said shut-off unit includes an optical switch for turning on and off said main beam.

10. An optical transmitter according to claim 9, wherein said optical switch comprises a Mach-Zehnder optical modulator.

11. An optical transmitter according to claim 9, wherein said optical switch comprises an electric-field absorption optical modulator.

12. An optical transmitter according to claim 9, wherein said optical switch includes a movable prism for mechanically switching an optical path of said optical signal.

13. A terminal-station apparatus for wavelength division multiplexing, comprising:
   a plurality of optical transmitters for outputting optical signals with wavelengths different from each other; and
   an optical multiplexer for carrying out wavelength division multiplexing on said optical signals and outputting a wavelength division multiplexed signal light resulting from said wavelength division multiplexing, wherein each of said optical transmitters comprises
      a light-source unit for generating an optical signal,
      a monitor for monitoring a parameter depending on a wavelength of said optical signal,
      a determiner for determining as to whether or not said monitored parameter satisfies a predetermined condition, and a shut-off unit for shutting off said optical signal in case said monitored parameter does not satisfy said predetermined condition, said monitor comprises a beam splitter for splitting said optical signal into a main beam and an auxiliary beam, an optical band-pass filter for being supplied with said auxiliary beam, and a photo detector for detecting a beam passing through said optical band-pass filter, said parameter is a power of said beam passing through said optical band-pass filter, and said predetermined condition is that said power of said beam passing through said optical band-pass filter is larger than a threshold value.

14. An optical communication system for wavelength division multiplexing, comprising:

first and second terminal-station apparatuses; and an optical-fiber transmission line for connecting said first terminal-station apparatus to said second terminal-station apparatus, wherein at least one of said first and second terminal station apparatuses comprises a plurality of optical transmitters for outputting optical signals with wavelengths different from each other, and an optical multiplexer for carrying out wavelength division multiplexing on said optical signals and outputting a wavelength division multiplexed signal light resulting from said wavelength division multiplexing, each of said optical transmitters comprises a light-source unit for generating an optical signal, a monitor for monitoring a parameter depending on a wavelength of said optical signal, a determiner for determining as to whether or not said monitored parameter satisfies a predetermined condition, and a shut-off unit for shutting off said optical signal in case said monitored parameter does not satisfy said predetermined condition, said monitor comprises a beam splitter for splitting said optical signal into a main beam and an auxiliary beam, an optical band-pass filter for being supplied with said auxiliary beam, and a photo detector for detecting a beam passing through said optical band-pass filter, said parameter is a power of said beam passing through said optical band-pass filter, and said predetermined condition is that said power of said beam passing through said optical band-pass filter is larger than a threshold value.

15. An optical communication system according to claim 14, further comprising an optical amplifier, provided on said optical fiber, for amplifying said wavelength multiplexed signal light.

16. An optical transmitter comprising:

a light-source unit for generating an optical signal;

a monitor for monitoring a parameter depending on a wavelength of said optical signal;

a determiner for determining as to whether or not said monitored parameter satisfies a predetermined condition; and a shut-off unit for shutting off said optical signal in case said monitored parameter does not satisfy said predetermined condition, wherein said light-source unit includes a laser diode, said light-source unit further includes means for monitoring a temperature of said laser diode, said monitor includes means for generating a monitor voltage representing said temperature of said laser diode, and said predetermined condition is that a magnitude of said monitored voltage is between first and second threshold values.

17. An optical transmitter according to claim 16, wherein said shut-off unit includes an optical switch for turning on and off said main beam.

18. An optical transmitter according to claim 16, wherein said light-source unit further includes means for supplying a driving current to said laser diode, and said shut-off unit includes means for controlling supply of said driving current to said laser diode.

19. An optical transmitter comprising:

a light-source unit for generating an optical signal;

a monitor for monitoring a parameter depending on a wavelength of said optical signal;

a determiner for determining as to whether or not said monitored parameter satisfies a predetermined condition; and a shut-off unit for shutting off said optical signal in case said monitored parameter does not satisfy said predetermined condition, wherein said monitor comprises a beam splitter for splitting said optical signal into a main beam and an auxiliary beam, means for providing an angle dispersion to said auxiliary beam, and a photo detector for detecting said auxiliary beam having said angle dispersion, and said parameter is a signal output by said photo detector.

20. An optical transmitter comprising:

a light source transmitting an optical signal; and a controller shutting off transmission of the optical signal when a power level of a branched portion of the optical signal does not satisfy a threshold condition.

21. An optical transmitter as in claim 20, wherein the controller comprises:

a beam splitter splitting the optical signal into first and second beams, the second beam being the branched portion;

an optical band-pass filter filtering the second beam;

a determiner determining whether or not the power of the filtered second beam satisfies the threshold condition; and a shut-off unit shutting off transmission of the first beam when the determiner determines that the power level of the filtered second beam does not satisfy the threshold condition.

22. An optical transmitter comprising:

a light source producing an optical signal;

a beam splitter splitting the optical signal into first and second lights, the first light being transmitted by the optical transmitter;

an optical band-pass filter filtering the second light;

a determiner determining whether or not the power of the filtered second light satisfies a threshold condition; and a shut-off unit shutting off transmission of the first light when the determiner determines that the power level of the filtered second light does not satisfy the threshold condition.

23. A method comprising:

transmitting an optical signal;

branching a portion of the optical signal;

filtering the branched portion with an optical band-pass filter; and shutting off transmission of the optical signal when a power level of the filtered, branched portion does not satisfy a threshold condition.

24. An optical transmitter comprising:

a light source transmitting an optical signal; and means for shutting off transmission of the optical signal when a power level of a branched portion of the optical signal does not satisfy a threshold condition.

* * * * *